United States Patent [19]
Heel et al.

[11] Patent Number: 5,186,476
[45] Date of Patent: Feb. 16, 1993

[54] CLAMPING DEVICE FOR GRIPPING A TOOL IN A TOOL CARRIER

[75] Inventors: Helmut Heel, Lengenwang; Manfred Fauter, Faistenoy; Peter Mohr, Wiggensbach; Franz Friedl, Marktoberdorf; Hans Kettel, Riederich, all of Fed. Rep. of Germany

[73] Assignee: Ott Maschinentechnik GmbH, Kempten, Fed. Rep. of Germany

[21] Appl. No.: 674,554

[22] Filed: Mar. 22, 1991

[30] Foreign Application Priority Data

Mar. 28, 1990 [DE] Fed. Rep. of Germany ....... 4009991
Sep. 11, 1990 [DE] Fed. Rep. of Germany ....... 4028775

[51] Int. Cl.⁵ .............................................. B23B 31/42
[52] U.S. Cl. ..................................... 279/2.03; 82/160; 279/2.15; 409/234
[58] Field of Search ................... 82/159, 160; 409/232, 409/234; 279/2.02, 2.03, 2.04, 2.15, 2.24, 2 R, 35, 36, 38–40, 47–49, 52, 53, 56

[56] References Cited

U.S. PATENT DOCUMENTS

| | | | |
|---|---|---|---|
| 4,715,753 | 12/1987 | Tack | 82/160 X |
| 4,726,268 | 2/1988 | Erickson | 82/160 |
| 4,784,542 | 11/1988 | Tack et al. | 82/160 X |
| 4,824,274 | 4/1989 | von Haas | 82/160 X |

FOREIGN PATENT DOCUMENTS

| | | | |
|---|---|---|---|
| 339321 | 11/1989 | European Pat. Off. | 279/2 R |
| 3813670 | 11/1989 | Fed. Rep. of Germany | 279/2 R |
| 1296314 | 3/1987 | U.S.S.R. | 279/2 R |

*Primary Examiner*—Steven C. Bishop
*Attorney, Agent, or Firm*—Flynn, Thiel, Boutell & Tanis

[57] ABSTRACT

A clamping device for gripping a tool in a carrier. The clamping device has a hollow centering extension or spigot and an abutment surface surrounding it are provided on the tool. A tool receptacle provided in the carrier has a receiving bore matched to the centering extension and an end face surrounding the bore and against which the abutment surface can be pressed by a clamping arrangement. The clamping arrangement comprises a clamping sleeve movable coaxially with respect to the central axis and a clamping ring or collet movable in the opposite direction to the clamping sleeve, both of which are provided with clamping cones facing towards one another. The collet is movable axially on the clamping sleeve by means of a clamping nut screwable on the sleeve. A plurality of clamping jaws surround the clamping sleeve and the collet concentrically and are supported in each case by one end against their clamping cones. The clamping jaws have at their two ends clamping surfaces which cooperate with a conical surface of the tool receptacle and with a conical surface oppositely directed with respect to that conical surface in the centering extension.

25 Claims, 5 Drawing Sheets

CLAMPING DEVICE FOR GRIPPING A TOOL IN A TOOL CARRIER

FIELD OF THE INVENTION

The invention relates to a clamping device for gripping a tool in a carrier, in particular in a turret of a machine tool.

BACKGROUND OF THE INVENTION

In a known clamping device of this kind for axially clamping two machine parts disengageable from one another (German Patent Specification 38 14 550 C1), an axially movable actuating rod is provided for operating the clamping sleeve. As a rule, this actuating rod is a draw rod arranged in a machine tool spindle and which can be pushed away from the tool by a set of cup springs and be moved by means of a piston and cylinder unit in opposition to the force of the spring arrangement for releasing the clamping device. By shifting the clamping sleeve under the action of the set of cup springs, the clamping jaws are moved radially outwards and apply themselves, on the one hand, against the inclined side of a groove in the interior of the hollow centring extension or spigot and, on the other hand, against a conical surface of the tool receptacle. In this way, an axial gripping force is likewise produced. In consequence of the axially movable actuating rod and the set of cup springs acting on it, as well as of the piston and cylinder unit, this known clamping device has a rather great over-all length, however, and for this reason cannot be used in particular in turrets. In fact, a plurality of tool receptacles and tools is arranged on such turrets, so that very confined space conditions exist therein. Moreover, it is endeavoured to design turrets as short as possible in the axial direction.

In another known clamping device (German Patent Specification 27 36 412 C2), three locking balls which are radially movable in corresponding transverse bores in the centring extension are provided as clamping elements. A central pressure ball arranged in a central bore in the centring extension and supported against the locking balls serves as a clamping arrangement and can be pushed towards the tool by means of differently designed clamping facilities. In this way, the locking balls are thrust radially outwards and in the process press on the conical surface of the tool receptacle. This produces a pressing of the abutment surface of the tool into contact against the end face. Owing to the centrally arranged pressure ball and the actuating arrangement acting on it likewise in the region of the central axis, it is not possible to employ this clamping device for so-called driven tools. In fact, such driven tools require, both in the centring extension and in the tool receptacle, a central free space for passing through a driving shaft or driving rod with which the tool can be driven rotationally and also adjusted. The locking balls and the pressure ball have the disadvantage that clamping forces are transmitted in point form only in three places. This results in a high specific surface pressure and, consequently, also relatively great wear not only at the balls themselves, but also at the conical surface cooperating with the locking balls on the tool receptacle. Also, on account of the high specific surface pressure, the maximum clamping force and, consequently, the force with which abutment surface and end surface are pressed against one another is small. Furthermore, the known clamping device also has the disadvantage that an important part of the device, namely the balls, is arranged in the tool itself. Each individual tool must therefore be equipped with such balls and corresponding bores and holding arrangements for the balls, which increases the cost of manufacturing the tools.

SUMMARY OF THE INVENTION

Therefore, the problem underlying the invention is to provide a clamping device for gripping a tool in a carrier, in particular in a turret of a machine tool, which has a central, through free space both in the centring extension and in the tool receptacle and is consequently suitable for driven tools, and which, moreover, makes possible a high clamping force in conjunction with low wear and has over-all dimensions which are as small as possible in particular in the axial direction.

According to a first solution, this is achieved in that the clamping arrangement moreover comprises a clamping ring or collet movable in the opposite direction to the clamping sleeve and bearing the second clamping cone, which faces towards the first clamping cone, and that the collet is movable axially relative to the clamping sleeve by means of a clamping nut screwable on the sleeve.

A second solution of the problem underlying the invention consists in that the clamping sleeve is movable axially by means of a clamping nut screwable on it and supported against an annular surface fixed with respect to the carrier and the tool receptacle.

These novel clamping devices have in each case, inside the clamping sleeve extending into the centering extension, a sufficiently large free space through which a driving shaft or a driving rod for a driven tool can readily be passed.

For this reason, these new clamping devices are suitable particularly for driven tools. If desired, this free space can also be used for other facilities, such as electronics, electrics, the supply of cooling lubricant, pressure media, air and the like. As a result of the clamping nut, which can be driven tangentially or axially, the clamping device has only a comparatively small over-all axial length and is therefore most suitable for installation in turrets. Because of the surface contact of the clamping jaws at the conical surfaces during the clamping process, a slight contact pressure and, consequently, slight wear occurs between the cooperating surfaces. Compared with the clamping device mentioned at the beginning, substantially greater axial contact forces can thereby also be obtained between the abutment surface and the end face and thereby also a higher rigidity between the tool and the carrier. The tools themselves become cheaper in comparison with the tools in the clamping device mentioned at the beginning, because they need to have in the interior of the hollow-formed centring extension merely the conical surface for engagement of the clamping jaws and otherwise no further parts of the clamping device.

BRIEF DESCRIPTION OF THE DRAWINGS

The invention is explained in detail in the following with the aid of embodiments shown in the drawing, in which.

DETAILED DESCRIPTION

Figure 1:
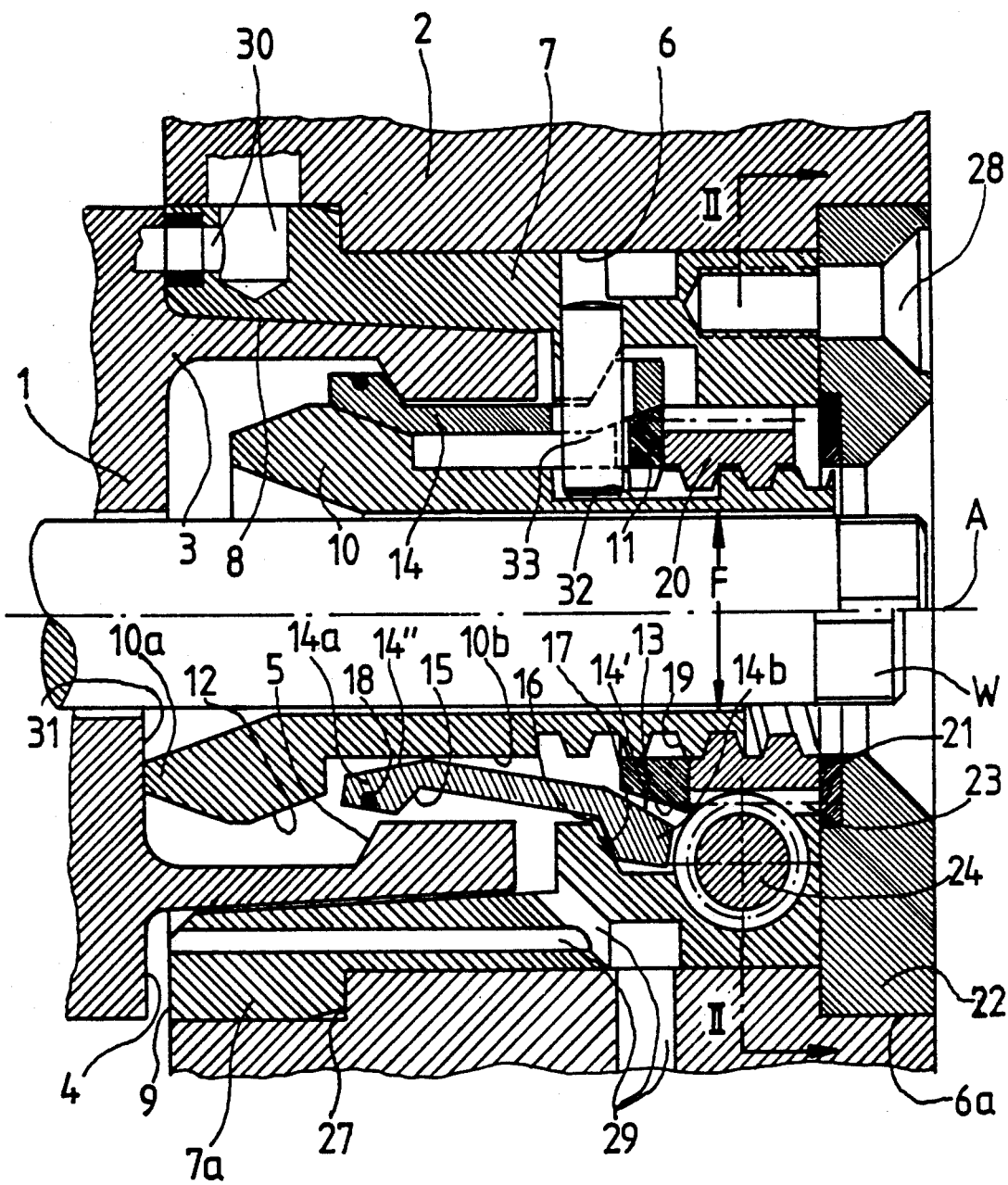
FIG. 1 shows a first embodiment in axial section, at the top in the clamped position and at the bottom in the released position.

In the drawing, 1 designates a tool which is to be connected to the carrier 2 via the clamping device. The carrier 2 is the turret of a machine tool, it also being possible to provide a star-shaped, drum or linear tool carrier or some other tool carrier instead of a turret.

The tool 1 has a hollow centering extension or spigot 3, which is conical in the embodiment shown. If need be, however, this centering extension may also be cylindrical. The centering extension 3 is surrounded by an abutment surface 4 extending perpendicularly to the extension or central axis A. Internally, the hollow-formed centering extension 3 moreover has a conical surface 5 which tapers conically towards the free end of the extension.

A bush 7 is inserted in a through bore 6 in the turret 2 as a tool receptacle. This bush or tool receptacle 7 has a receiving bore 8 matched to the centering extension 3 and adjoined outside it by an end face 9 extending perpendicularly to the central axis. The abutment surface 4 is to be pressed against this end face 9 by means of the clamping device. If necessary, the tool receptacle 7 could also be formed directly in the turret 2, which, however, would be more complicated as regards manufacturing technique.

A hollow clamping sleeve is arranged in the bush coaxially with the central axis A and projects for approximately half its length into the centering extension 3. Moreover, a collet 11 surrounding the clamping sleeve 10 concentrically is provided. The clamping sleeve 10 and the collet 11 are respectively provided on the outside with clamping cones 12, 13 turned towards one another.

The clamping sleeve 10 and the collet 11 are surrounded by a plurality of clamping jaws 14 arranged at equal angular intervals of their circumference and which extend substantially parallel to the central axis. The clamping jaws 14 are supported in each case by their front end 14a against the clamping cone 12 of the clamping sleeve and by their rear end 14b against the conical surface 13 of the collet 11. The jaws moreover have at their two ends 14a, 14b, clamping surfaces 15, 16 which face one another. The clamping surface 15 cooperates with the conical surface 5 of the centering extension and the clamping surface 16 cooperates with an oppositely directed conical surface 17 on the bush or tool receptacle 7. The angular position of the clamping surfaces 15 and 16 with respect to the central axis A corresponds to the angular position of the conical surfaces 5, 17 during the actual clamping process, so that during this process surface contact exists between the clamping surfaces 15, 16 and the conical surfaces 5, 17. The ends 14a of the clamping jaws 14 which are located towards the tool are advantageously embraced by an annular spring (worm spring) 18. Following on the clamping cone 12, the clamping sleeve 10 is provided with a recessed portion 10b into which the ends 14a of the clamping jaws 14 which are located towards the tool can be swung radially inwards when the collet or clamping ring 11 has been released, as shown in FIG. 1 at the bottom. In this way, the result can be achieved that, for a relatively short expulsion stroke of the clamping sleeve, the ends 14a of the clamping jaws 14 which are located towards the tool can be swung inwardly by a comparatively large amount and release the conical surface 5.

At its rear end remote from the tool, the clamping sleeve 10 is provided with a thread 19 on which the clamping nut 20 can be screwed. The clamping nut 20 cooperates in one direction of rotation with the collet 11 and in the opposite direction of rotation with a stop ring 21 inserted in the retaining ring 22.

Figure 2:
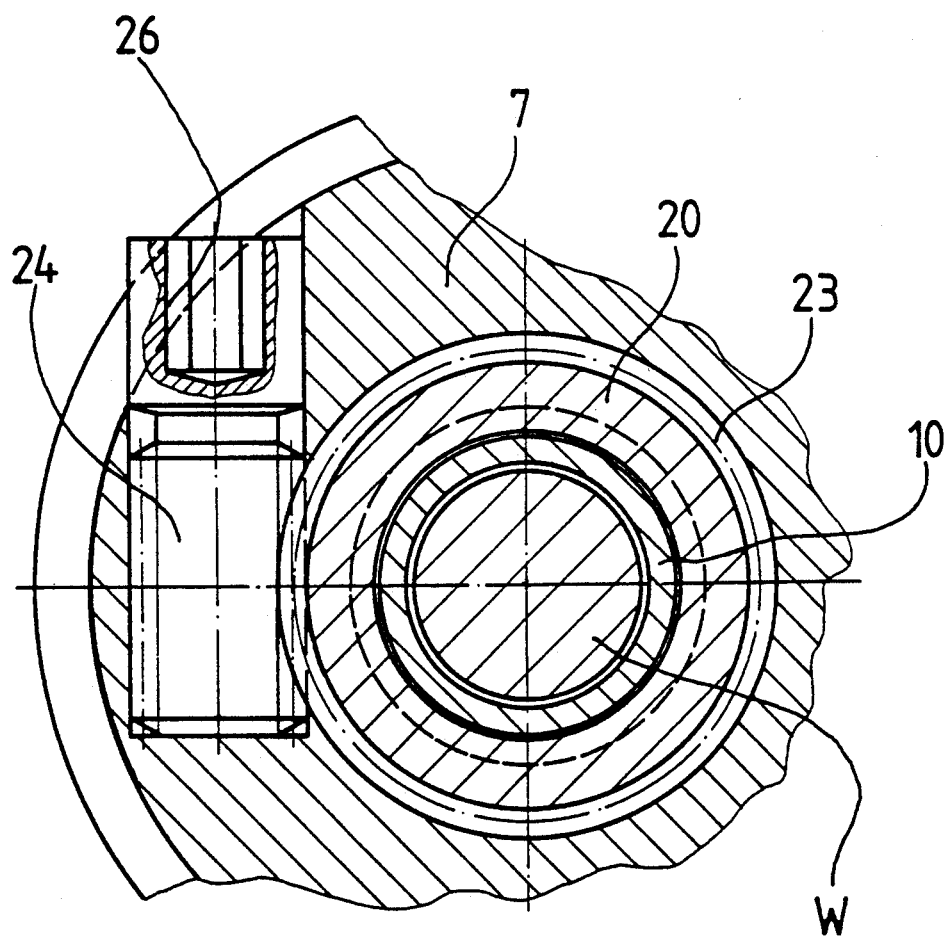
FIG. 2 is a partial cross-section on the line II—II in FIG. 1.

At its outer periphery, the clamping nut 20 is provided with a toothing 23 in which a worm 24 engages in the embodiment illustrated in FIGS. 1 and 2. In accordance with FIG. 2, the worm 24 is mounted to be rotatable, but axially immovable, in the bush or tool receptacle 7. It can be turned by means of a spanner engaging in its internal hexagon 26.

In order to fix the bush 7 in the through bore 6, the bush 7 has a flange 7a which is supported against an annular shoulder 27 of the carrier 2. The retaining ring 22 is inserted in a countersunk part 6a of the through bore 6 and connected to the rear end of the bush 7 through the medium of retaining screws 28.

As can be perceived in particular from FIG. 1, a sufficiently large through free space F is present inside the clamping sleeve, the space being open at the front and rear. In consequence, the driving shaft W or a driving rod for a driven tool can extend unimpeded through this free space F.

The bores 29 provided in the bush 7 serve to supply compressed air in order to clean the centering extension 3, the receiving bore 8 and the abutment surface 4 and end face 9 during the insertion of the tool. Cooling lubricant can be fed to the tool through the bores 30. In the event of a non-driven tool being involved, the supply of cooling lubricant could also take place by way of a tube extending through the free space F.

The novel clamping device operates in the following manner:

To connect the tool 1 to the carrier 2, the tool is inserted by means of its centering extension 3 into the receiving bore 8 with the clamping device released (FIG. 1, bottom). By rotating the worm 24, the clamping nut 20 is driven and, in accordance with FIG. 1, moves the collet 11 to the left towards the tool. The collet 11 presses by means of its clamping cone 13 on the surface 14' of each clamping jaw 14. As a result of this, the ends 14a of the clamping jaws 14 which are located towards the tool are swung outwardly in opposition to the force of the annular spring 18 until their clamping surfaces 15, 16 bear flat against the conical surfaces 5, 17. At the same time, owing to the rotation of the clamping nut 20, the clamping sleeve 10 is moved away from the tool and its conical surface 12 comes into abutment against the surface 14" of the front end 14a of each clamping jaw. Now begins the clamping process proper, in which the clamping jaws 14 are pushed radially outwards by the clamping cones 12, 13. The clamping surfaces 15, 16 of the clamping jaws act similarly to a wedge on the conical surfaces 5 and 17. Because of this, the abutment surface 4 is pressed hard against the end face 9. During the clamping process proper, the angular position of the clamping jaws 14 in relation to the central axis A does not change, so that the clamping surfaces 15 and 16 constantly have surface contact with the associated conical surfaces 5 and 17, respectively. The surface pressure and the wear are kept low in this way. At the end of the clamping process, the parts of the clamping device adopt the position shown in FIG. 1 at the top.

To release the clamping device, the clamping nut 20 is rotated in the opposite direction by means of the worm 24. As a result, the nut first moves in the axial direction until it comes to rest against the abutment ring 21. On further rotation of the clamping nut 20, the clamping sleeve 10 is shifted to the left towards the tool, whereby the clamping cone 12 first gets out of range of the clamping jaws 14. Under the action of the annular spring 18, the jaws can swing radially inwards. On further rotation of the clamping nut 20, an axial extension 10a provided at the free end of the clamping sleeve 10 comes into abutment against a throw-out or expulsion surface 31 of the tool 1. Owing to this, the centering extension 3 is pushed a little out of the receiving bore 8, which is also described as expulsion. In this process, the locking pin 33 engaging by means of its radially inner end in an axial slot 32 in the clamping sleeve 10 limits the throw-out movement of the clamping sleeve 10 and moreover prevents any rotation of the clamping sleeve during the rotation of the clamping nut 20.

Figure 3:
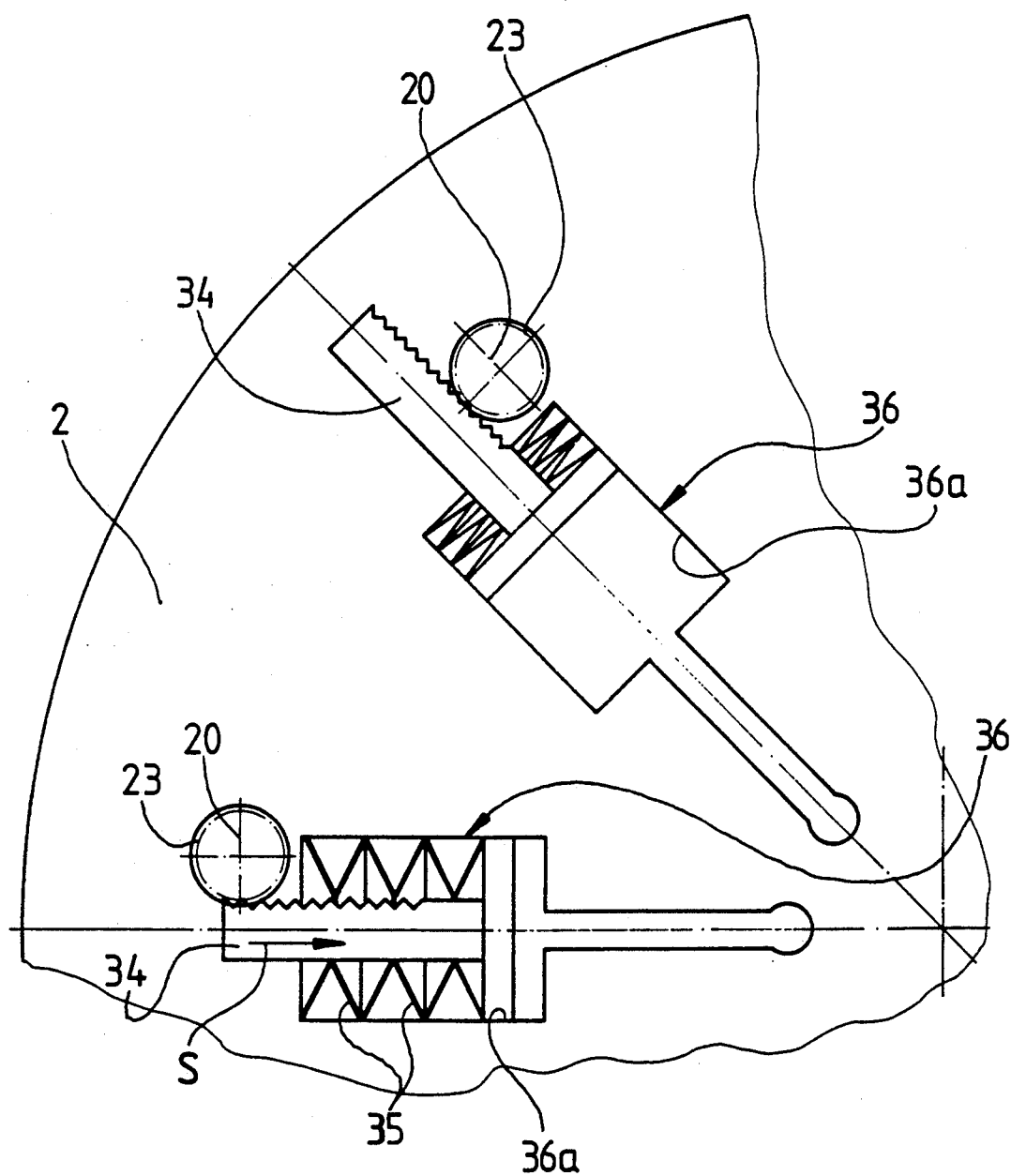
FIG. 3 is a basic representation of another actuating arrangement for the clamping nut.

For automatic tool changing, the actuating arrangement shown in FIG. 3 may be provided for rotating the clamping nut 20 instead of the worm 24. Since all the remaining parts of the clamping device are designed similarly to the embodiment illustrated in FIGS. 1 and 2, only the clamping nut 20 with its toothing 23 is shown in each case in FIG. 3. At the top, FIG. 3 shows the actuating arrangement in the released position of the clamping device and, at the bottom, it shows the arrangement in the clamping position of the device. In the carrier 2 and also in the tool receptacle 7 not shown in FIG. 3, a rack 34 for each clamping nut 20 is movable tangentially to the clamping nut 20 and meshes with it. The rack 34 is loaded in the clamping direction S by a cup spring arrangement 35. In this way, the clamping nut 20 is turned in a direction of rotation which presses the clamping nut 20 against the clamping ring or collet 11. A piston and cylinder unit 36, which is hydraulic, is provided for releasing the clamping device. By admitting pressure to the cylinder chamber 36a, the rack 34 can be shifted in opposition to the force of the spring arrangement 35 out of its clamping position shown at the bottom in FIG. 3 into the release position shown at the top in FIG. 3 and the clamping device can thereby be released.

Figure 4:
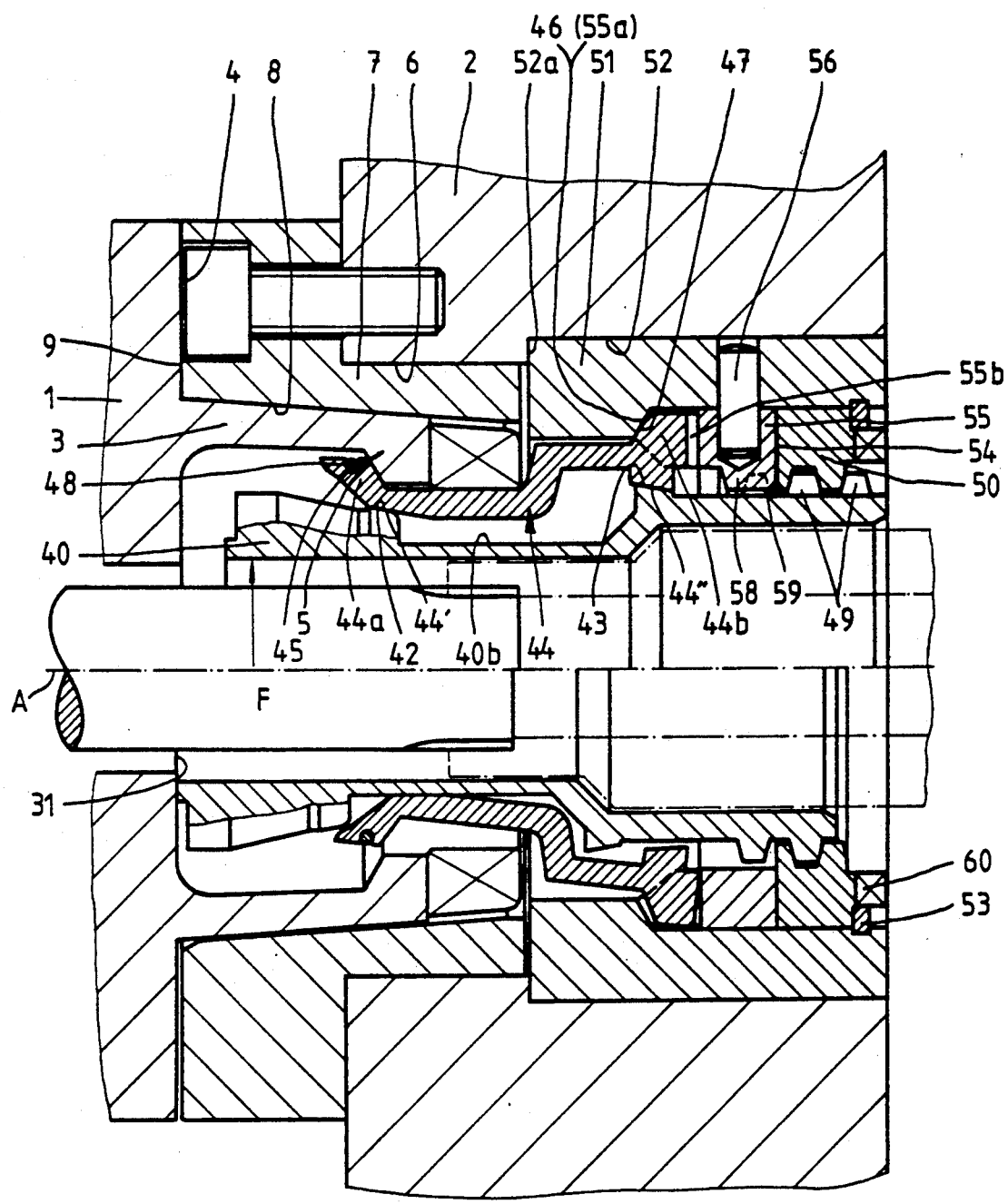
FIG. 4 shows a second embodiment in axial section, at the top in the clamped position and at the bottom in the released position (section through a clamping jaw 44)

In the embodiment shown in FIG. 4, the features of the tool 1 and of the tool receptacle 7 correspond to the embodiment shown in FIG. 1.

A hollow clamping sleeve 40 is arranged in the bush 7 coaxially with the central axis A and extends approximately for half its length into the centring extension or spigot 3. The clamping sleeve is provided on the outside with two clamping cones 42, 43 disposed at an axial distance from one another and which are unidirectional, i.e. both are tapered away from the tool 1. The clamping sleeve 40 is surrounded by a plurality of clamping jaws 44 arranged at equal angular intervals of its circumference and which extend substantially parallel to the central axis A. The clamping jaws 44 are supported in each case by their front ends 44a against the clamping cone 42 and by their rear ends 44b against the clamping cone 43. The jaws moreover have at their two ends 44a, 44b, clamping surfaces 45, 46 which face one another. The clamping surface 45 cooperates with the conical surface 5 of the centring extension 3 and the clamping surface 46 cooperates with an oppositely directed conical surface 47 on a second bush 51 inserted from the rear into a bore 52 in the carrier 2 and supported against a shoulder 52a of the bore. If need be, the conical surface 47 could also be provided on the bush 7, as in the first embodiment, or directly in the carrier 2. The angular position of the clamping surfaces 45 and 46 with respect to the central axis A corresponds during the clamping process proper to the angular position of the conical surfaces 5, 47, so that during the clamping process surface contact exists between the clamping surfaces 45, 46 and the conical surfaces 5, 47. The ends 44a of the clamping jaws 44 which are located towards the tool are advantageously embraced by an annular spring (worm spring) 48. As in the first embodiment, the clamping sleeve 40 is provided adjacent the clamping cone 42 with a recessed portion 40b into which the ends 44a of the clamping jaws 44 which are located towards the tool can be swung radially inwards when the clamping nut 50 has been released, as shown in FIG. 4 at the bottom.

At its rear end remote from the tool 1, the clamping sleeve 40 is provided with a thread 49 on which the clamping nut 50 can be screwed. At the rear, the clamping nut 50 is supported against a Seeger retaining ring 53 or the like. At the front, the clamping nut 50 is supported against an annular surface 54 which is fixed with respect to the carrier 2 and the tool receptacle 7. In the embodiments illustrated in FIGS. 4 and 5, this annular surface is arranged in each case on an abutment ring 55, 55' which for its part has at its front end a conical surface 55a by which it is supported against the conical surface 47 of the bush 51. The abutment ring 55, 55' has a number of axial slots 55b corresponding to the number of clamping jaws 44 and in which the rear ends 44b of the clamping jaws engage. In this way, on the one hand, support of the abutment ring 54 and 55 or 55' and of the rear ends 44b of the clamping jaws 44 against one and the same conical surface 47 is made possible and, on the other hand, the clamping jaws are held at their equal intervals by the abutment ring 55 or 55'. So that, on rotation of the clamping nut 50, the abutment ring 55 or 55' does not rotate with it, as shown in FIG. 4 a radial retaining pin 56 engaging in the bush 51 is provided. In the embodiment shown in FIGS. 5 and 6, the abutment ring has a retaining stud 57 which is directed radially outwards and engages in an axial groove 51a in the bush 51 and thereby secures the abutment ring against twisting. In order also to secure the clamping sleeve 44 against twisting, each of the abutment rings 55, 55' has a stud 58 which is directed radially inwards and engages in an axial groove 59 in the clamping sleeve 40. This can be seen from FIG. 6.

The clamping nut 50 is provided with driving dogs 60 at its axially rear end. These driving dogs 60 can be acted on by a rotating drive (not shown), for example a hydraulically operated rotating cylinder, an electric rotating magnet or even an electric screwing tool. The embodiments shown in FIGS. 4-6 have the advantage that the clamping nut 50 needs to be rotated only through about 180° for releasing and tightening the clamping device.

Figure 5:
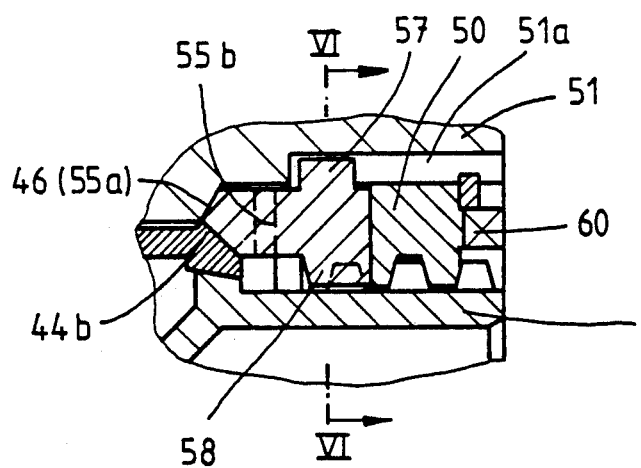
FIG. 5 is a partial axial section of a modified form of the second embodiment (section between two clamping jaws 44)
Figure 6:
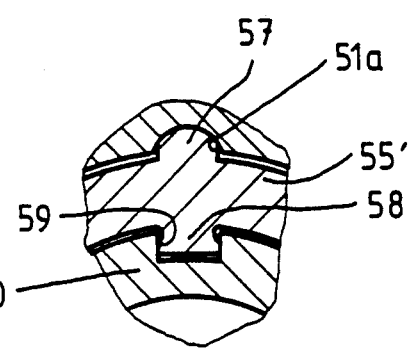
FIG. 6 is a partial cross-section on the line VI—VI in FIG. 5.

The clamping device shown in FIGS. 4–6 operates in the following manner:

To connect the tool 1 to the carrier 2, the tool is inserted by means of its centring extension or spigot 3 into the receiving bore 8 with the clamping device released (FIG. 4, bottom). The clamping nut 50 is rotated by means of the rotating drive (not shown) acting on the driving dogs 60. Since the nut is secured against axial shifting by the annular surface 54 of the abutment ring 55, which for its part is supported by its conical surface 55a against the conical surface 47, the clamping sleeve 40 is moved to the right in accordance with FIG. 1. As a result, the ends 44a of the clamping jaws 44 which are located towards the tool are swung outwardly in opposition to the force of the annular spring 48 until their clamping surfaces 45, 46 bear flat against the conical surfaces 5, 47. The clamping sleeve now presses by means of its clamping cones 42,43 on the surfaces 44', 44" and there begins the clamping process proper, in which the clamping jaws 44 are pushed radially outwards by the clamping cones 42, 43. The clamping surfaces 45, 46 of the clamping jaws act similarly to a wedge on the conical surfaces 5, 47. Because of this, the abutment surface 4 is pressed hard against the end face 9. During the clamping process proper, surface contact exists between the clamping surfaces 45 and 46 and the associated conical surfaces 5 and 47, respectively, whereby the surface pressure and the wear are kept low. At the end of the clamping process, the parts of the clamping device adopt the position shown in FIG. 4 at the top.

Release of the clamping device takes place through rotation of the clamping nut 50 in the opposite direction. All the previously described parts now move in the opposite direction. When the clamping jaws 44 have been swung inwardly by the action of the annular spring 48, an axial extension provided at the free end of the clamping sleeve 40 comes into abutment against the throw-out or expulsion surface 31 of the tool. Owing to this, the centering extension 3 is pushed a little out of the receiving bore 8 and the release of the tool is thereby terminated.

The embodiments of the invention in which an exclusive property or privilege is claimed are defined as follows:

1. In a clamping device for gripping a tool in a carrier in a turret of a machine tool, the clamping device having a conical or cylindrical hollow centering extension provided on the tool and an abutment surface adjoining the centering extension and extending perpendicularly to a central axis of the clamping device, a tool receptacle provided in the carrier and which has a receiving bore matched to the centering extension and an end face adjoining the bore and extending perpendicularly to the central axis and against which the abutment surface can be pressed, and a plurality of clamping jaws movable radially with respect to the central axis, acting on the centering extension and on a conical surface fixed with respect to the carrier and the tool receptacle and which can be pushed radially outwards by means of an axially movable clamping arrangement, the clamping arrangement comprising a clamping sleeve movable coaxially with respect to the central axis, also engaging in the centering extension and provided with a clamping cone which is arranged at an axial distance from a second clamping cone, the clamping jaws being arranged concentrically with respect to the clamping sleeve and substantially parallel to the central axis in the clamping position and being supported in each case by one end against the clamping cones, and the clamping jaws having at both their ends clamping surfaces whose angular position as regards the central axis is adapted to the conical surface of the tool receptacle and to a conical surface in the centering extension which is oppositely directed with respect to that conical surface, so that during the clamping process proper surface contact exists between the clamping surfaces and the conical surfaces, the improvement wherein the clamping arrangement moreover comprises a clamping ring or collet movable in the opposite direction to the clamping sleeve and bearing the second clamping cone, which faces towards the first clamping cone, and wherein the collet is movable axially relative to the clamping sleeve by means of a clamping nut screwable on the sleeve.

2. The clamping device according to claim 1, wherein the axial adjustment path of the clamping nut in the direction away from the tool is limited by a stop ring, and at the free end of the clamping sleeve an axial extension is provided which cooperates with a throw-out surface provided on the tool for releasing it.

3. The clamping device according to claim 1, wherein the clamping nut is provided at its outer periphery with a toothing in which a worm mounted in the tool receptacle engages.

4. The clamping device according to claim 1, wherein the clamping nut is provided with a toothing at its outer periphery and a rack is movable in the carrier or the tool receptacle tangentially to the clamping nut.

5. The clamping device according to claim 4, wherein the rack is loaded in the clamping direction by a spring arrangement.

6. The clamping device according to claim 5, wherein a piston and cylinder unit is provided for shifting the rack in opposition to the force of the spring arrangement.

7. The clamping device according to claim 1, wherein the ends of the clamping jaws which are located towards the tool are embraced by an annular spring and, following on its clamping cone, the clamping sleeve has a recessed portion into which the ends of the clamping jaws which are located towards the tool can be swung radially inwards when the clamping nut has been released.

8. The clamping device according to claim 1, wherein the tool receptacle is formed by a bush which can be inserted in a bore in the carrier.

9. The clamping device according to claim 8, wherein the bush is provided at its front end located towards the tool with a flange which is supported against an annular shoulder in the bore formed as a through bore in the carrier and, at the end of the through bore remote from the tool a retaining ring is arranged which is connected to the rear end of the bush through the medium of a screw connection.

10. The clamping device according to claim 9, wherein an end face is provided on the flange of the bush.

11. The clamping device according to claim 1, wherein the clamping nut is provided with driving dogs at its axially rear end for the engagement of a rotating drive.

12. In a clamping device for gripping a tool in a carrier in a turret of a machine tool, the clamping device having a conical or cylindrical hollow centering extension provided on the tool and an abutment surface adjoining the centering extension and extending perpendicularly to a central axis of the clamping device, a tool receptacle provided in the carrier and which has a receiving bore matched to the centering extension and an end face adjoining the bore and extending perpendicularly to the central axis and against which the abutment surface can be pressed, and a plurality of clamping jaws movable radially with respect to the central axis, acting on the centering extension and on a conical surface fixed with respect to the carrier and the tool receptacle and which can be pushed radially outwards by means of an axially movable clamping arrangement, the clamping arrangement comprising a clamping sleeve movable coaxially with respect to the central axis, also engaging in the centering extension and provided with two unidirected clamping cones arranged at an axial distance from one another, the clamping jaws being arranged concentrically with respect to the clamping sleeve and substantially parallel to the central axis in the clamping position and being supported in each case by one end against the clamping cones, and the clamping jaws having at both their ends clamping surfaces whose angular position as regards the central axis is adapted to be fixed conical surface and to a conical surface in the centering extension which is oppositely directed with respect to that conical surface, so that during the clamping process proper surface contact exists between the clamping surfaces and the conical surfaces, the improvement wherein the clamping sleeve is movable axially by means of a clamping nut screwable on it and supported against an annular surface fixed with respect to the carrier and the tool receptacle, and wherein the fixed annular surface is arranged on an abutment ring secured against axial shifting and twisting with respect to the carrier.

13. The clamping device according to claim 2, wherein the abutment ring is arranged in a bush surrounding it concentrically which is inserted from the back of the carrier remote from the tool receptacle into a bore in the carrier.

14. The clamping device according to claim 13, wherein the bore has a shoulder against which the bush is supported.

15. The clamping device according to claim 13, wherein the conical surface for support of the clamping surfaces of the clamping jaws is arranged in the bush.

16. The clamping device according to claim 2, wherein the abutment ring has at its front end a conical surface by means of which it is supported against the conical surface of the bush, and the abutment ring has a number of axial slots corresponding to the number of clamping jaws and in which the rear ends of the clamping jaws engage.

17. The clamping device according to claim 2, wherein the abutment ring is secured against rotation by a radial retaining pin engaging in a bore in the bush and the abutment ring.

18. The clamping device according to claim 2, wherein the abutment ring has a retaining stud directed radially outwards which engages in an axial groove in the bush.

19. The clamping device according to claim 17, wherein the abutment ring has a stud directed radially inwards which engages in an axial groove in the clamping sleeve.

20. The clamping device according to claim 12, wherein the clamping nut is provided with a toothing at its outer periphery and a rack is movable in the carrier or the tool receptacle tangentially to the clamping nut.

21. The clamping device according to claim 12, wherein the ends of the clamping jaws which are located towards the tool are embraced by an annular spring and, following on its clamping cone, the clamping sleeve has a recessed portion into which the ends of the clamping jaws which are located towards the tool can be swung radially inwards when the clamping nut has been released.

22. The clamping device according to claim 12, wherein the tool receptacle is formed by a bush which can be inserted in a bore in the carrier.

23. The clamping device according to claim 22, wherein the bush is provided at its front end located towards the tool with a flange which is supported against an annular shoulder in the bore formed as a through bore in the carrier and, at the end of the through bore remote from the tool a retaining ring is arranged which is connected to the rear end of the bush through the medium of a screw connection.

24. The clamping device according to claim 22, wherein an end face is provided on the flange of the bush.

25. The clamping device according to claim 12, wherein the clamping nut is provided with driving dogs at its axially rear end for the engagement of a rotating drive.

* * * * *

UNITED STATES PATENT AND TRADEMARK OFFICE
CERTIFICATE OF CORRECTION

PATENT NO. : 5 186 476
DATED : February 16, 1993
INVENTOR(S) : Helmut HEEL et al It is certified that error appears in the above-indentified patent and that said Letters Patent is hereby corrected as shown below:

```
Column  8, line 31; change "4" to ---3---.
           line 57; change "9" to ---8---.
Column  9, line 35; change "2" to ---12---.
           line 46; change "2" to ---12---.
Column 10, line  5; change "2" to ---12---.
           line  9; change "2" to ---12---.
```

Signed and Sealed this

Fourteenth Day of December, 1993

Attest:

BRUCE LEHMAN

*Attesting Officer*  *Commissioner of Patents and Trademarks*